(12) United States Patent
Saviers et al.

(10) Patent No.: US 11,990,825 B2
(45) Date of Patent: May 21, 2024

(54) AIRCRAFT ELECTRIC MOTOR

(71) Applicant: Hamilton Sundstrand Corporation, Charlotte, NC (US)

(72) Inventors: Kimberly Rae Saviers, Glastonbury, CT (US); Abbas A. Alahyari, Glastonbury, CT (US); Jagadeesh Kumar Tangudu, South Windsor, CT (US); Joseph Turney, Amston, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 173 days.

(21) Appl. No.: 17/522,118

(22) Filed: Nov. 9, 2021

(65) Prior Publication Data

US 2023/0142019 A1     May 11, 2023

(51) Int. Cl.
| | |
|---|---|
| H02K 3/24 | (2006.01) |
| B64D 27/24 | (2006.01) |
| B64D 33/08 | (2006.01) |
| H02K 3/22 | (2006.01) |
| H02K 5/20 | (2006.01) |
| H02K 9/20 | (2006.01) |

(52) U.S. Cl.
CPC ............... *H02K 9/20* (2013.01); *B64D 27/24* (2013.01); *B64D 33/08* (2013.01); *H02K 3/22* (2013.01); *H02K 5/20* (2013.01)

(58) Field of Classification Search
CPC .................................. H02K 3/22; H02K 3/24
See application file for complete search history.

(56) References Cited

U.S. PATENT DOCUMENTS

| | | |
|---|---|---|
| 6,340,853 B1 | 1/2002 | Kaiho et al. |
| 11,025,108 B2 | 6/2021 | Yun et al. |
| 2020/0220421 A1 | 7/2020 | Yoshioka et al. |
| 2021/0305883 A1 | 9/2021 | Vanhee et al. |
| 2021/0344255 A1 | 11/2021 | Said et al. |

FOREIGN PATENT DOCUMENTS

| | | |
|---|---|---|
| DE | 102020105788 A1 | 9/2021 |
| WO | 2020191167 A1 | 9/2020 |
| WO | 2021164946 A1 | 8/2021 |

OTHER PUBLICATIONS

Extended European Search Report; dated Apr. 5, 2023; EP Application No. 22194969.6-1202; 19 pages.

*Primary Examiner* — Ramon M Barrera
(74) *Attorney, Agent, or Firm* — CANTOR COLBURN LLP

(57) ABSTRACT

Aircraft electric motors are described. The aircraft electric motors includes a motor unit having a rotor and a stator, wherein the stator includes a plurality of windings and cooling channels arranged to provide cooling to the plurality of windings, a drive unit configured to drive operation of the motor unit, and a cooling system. The cooling system includes at least one cooling channel integrally formed within at least one winding, wherein the at least one cooling channel comprises an inlet to receive a two-phase cooling fluid and an outlet configured to discharge the two-phase cooling fluid, wherein a cross-sectional area of the at least one cooling channel at the inlet is less than a cross-sectional area of the at least one cooling channel at the outlet.

20 Claims, 12 Drawing Sheets

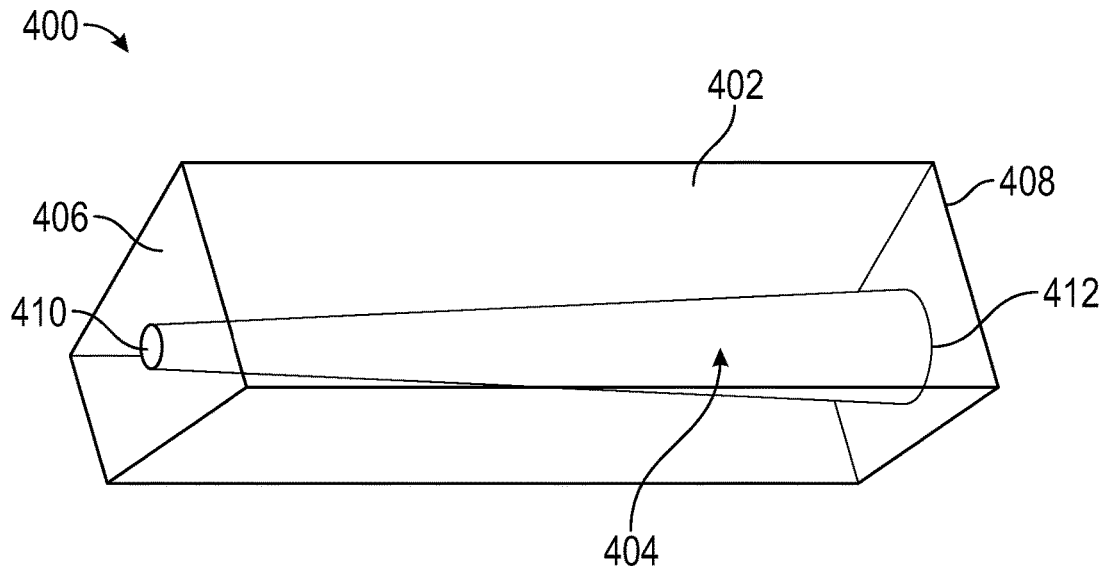
FIG. 4A
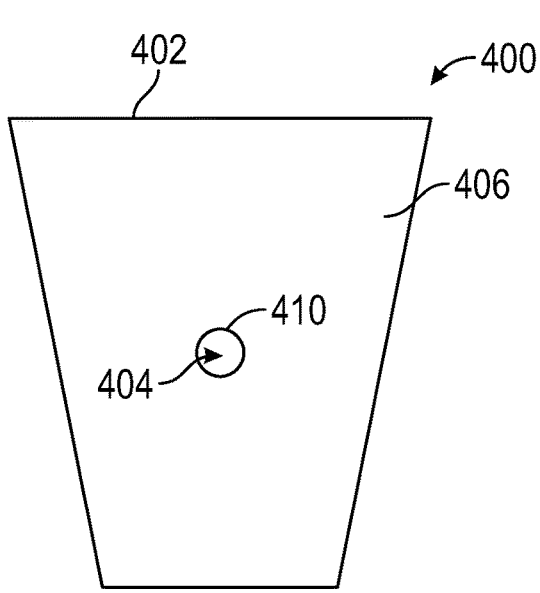 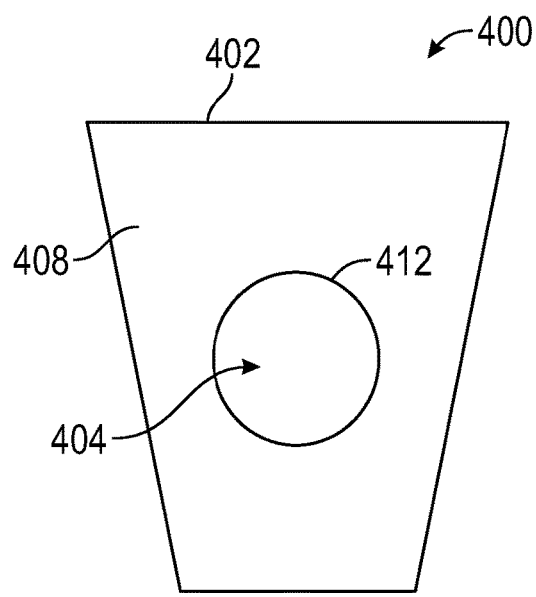
FIG. 4B          FIG. 4C

AIRCRAFT ELECTRIC MOTOR

STATEMENT OF FEDERAL SUPPORT

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density with a light weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system. The cooling system includes at least one cooling channel integrally formed within at least one winding, wherein the at least one cooling channel comprises an inlet to receive a two-phase cooling fluid and an outlet configured to discharge the two-phase cooling fluid, wherein a cross-sectional area of the at least one cooling channel at the inlet is less than a cross-sectional area of the at least one cooling channel at the outlet.

In addition to one or more of the features described herein, or as an alternative, further embodiments of the aircraft electric motors may include that the at least one winding has a first end and a second end, wherein the inlet is formed in the first end and the outlet is formed in the second end.

In addition to one or more of the features described herein, or as an alternative, further embodiments of the aircraft electric motors may include that the at least one winding has a first end and a second end, wherein the inlet is formed in the first end and the outlet is formed in the first end.

In addition to one or more of the features described herein, or as an alternative, further embodiments of the aircraft electric motors may include that the at least one cooling channel comprises a plurality of cooling channels formed within the at least one winding.

In addition to one or more of the features described herein, or as an alternative, further embodiments of the aircraft electric motors may include that the at least one winding has a first end and a second end, wherein the inlet of each of the plurality of cooling channels is formed in the first end and the outlet of each of the plurality of cooling channels is formed in the second end.

In addition to one or more of the features described herein, or as an alternative, further embodiments of the aircraft electric motors may include that the at least one winding has a first end and a second end, wherein the inlet of each of the plurality of cooling channels is formed in the first end and the outlet of each of the plurality of cooling channels is formed in the first end.

In addition to one or more of the features described herein, or as an alternative, further embodiments of the aircraft electric motors may include that the at least one winding comprises a turn proximate the second end of the winding.

In addition to one or more of the features described herein, or as an alternative, further embodiments of the aircraft electric motors may include that the at least one cooling channel comprises a single inlet and a plurality of outlets, wherein the single inlet is fluidly connected to each of the plurality of outlets.

In addition to one or more of the features described herein, or as an alternative, further embodiments of the aircraft electric motors may include that the least one cooling channel comprises an inlet section defined by a single passage and a branching section defined by a plurality of passages, wherein the single passage of the inlet section is fluidly coupled to each of the plurality of passages of the branching section.

In addition to one or more of the features described herein, or as an alternative, further embodiments of the aircraft electric motors may include that the at least one cooling channel comprises at least one surface feature arranged to reduce a cross-sectional area of the at least one cooling channel proximate the inlet and has a decreasing impact on the cross-sectional area of the at least one cooling channel in a direction toward the outlet.

In addition to one or more of the features described herein, or as an alternative, further embodiments of the aircraft electric motors may include that the at least one surface feature comprises at least one rib or blade extending from the inlet toward the outlet along the at least one cooling channel.

In addition to one or more of the features described herein, or as an alternative, further embodiments of the aircraft electric motors may include that the at least one surface feature comprises a surface coating applied to a surface of the at least one cooling channel.

In addition to one or more of the features described herein, or as an alternative, further embodiments of the aircraft electric motors may include that the cross-sectional area of the inlet of the at least one cooling channel is 50% or less than the cross-sectional area of the outlet.

In addition to one or more of the features described herein, or as an alternative, further embodiments of the aircraft electric motors may include that the cross-sectional area of the outlet of the at least one cooling channel is at least twice the cross-sectional area of the inlet.

In addition to one or more of the features described herein, or as an alternative, further embodiments of the aircraft electric motors may include that the windings are arranged in a U-shape configuration.

In addition to one or more of the features described herein, or as an alternative, further embodiments of the aircraft electric motors may include that the motor unit comprises rotor having U-shaped magnets arranged about the windings of the stator.

In addition to one or more of the features described herein, or as an alternative, further embodiments of the aircraft electric motors may include that the cooling system further includes a header and a heat exchanger configured to supply cooling fluid into the at least one cooling channel.

In addition to one or more of the features described herein, or as an alternative, further embodiments of the aircraft electric motors may include a pump configured to pump the cooling fluid from the header into the at least one cooling channel.

In addition to one or more of the features described herein, or as an alternative, further embodiments of the aircraft electric motors may include that the rotor and stator are arranged in an annular configuration.

In addition to one or more of the features described herein, or as an alternative, further embodiments of the aircraft electric motors may include that the two-phase cooling fluid is one of a hydrofluorocarbon (HFC), a hydrofluoro-olefin (HFO), or a hydrofluoroether (HFE).

In accordance with some embodiments, aircraft electric motors are provided. The aircraft electric motors include a motor unit having a rotor and a stator, wherein the stator includes a plurality of windings and cooling channels arranged to provide cooling to the plurality of windings, a means for driving operation of the motor unit, and a cooling system. The cooling system includes at least one cooling channel integrally formed within at least one winding, wherein the at least one cooling channel comprises an inlet to receive a two-phase cooling fluid and an outlet configured to discharge the two-phase cooling fluid, wherein the at least one cooling channel defines a means for accommodating a change in phase of the two-phase fluid as it passes through the at least one cooling channel.

In addition to one or more of the features described herein, or as an alternative, further embodiments of the aircraft electric motors may include that the means for driving operation of the motor unit comprises at least one power module system, and the means for accommodating a change in phase of the two-phase fluid comprises a cross-sectional area of the at least one cooling channel at the inlet being less than a cross-sectional area of the at least one cooling channel at the outlet.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 4A is a schematic illustration of a portion of an aircraft electric motor system in accordance with an embodiment of the present disclosure;

FIG. 4B is a schematic illustration of a first end of the portion shown in FIG. 4A;

FIG. 4C is a schematic illustration of a second end of the portion shown in FIG. 4A;

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
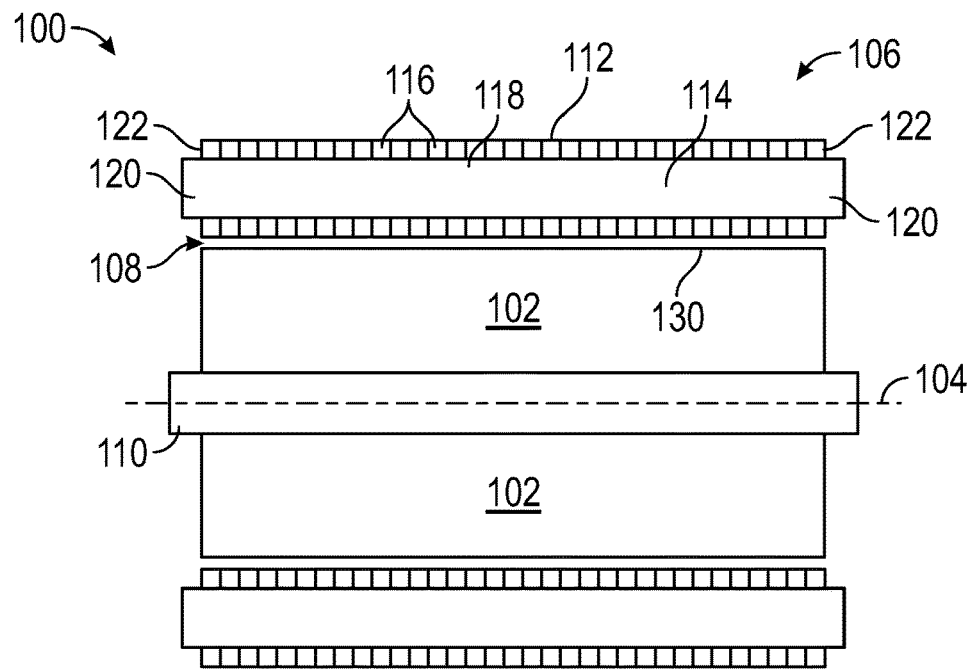
FIG. 1A is a partial view of an embodiment of electric motor.
Figure 1B:
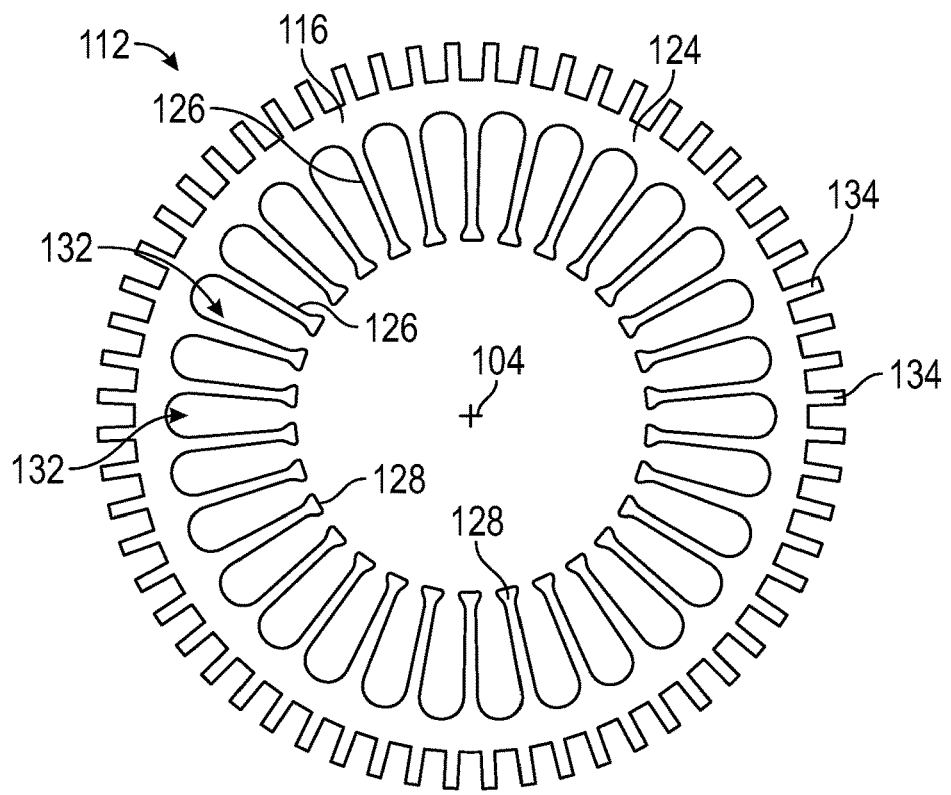
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system.

Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
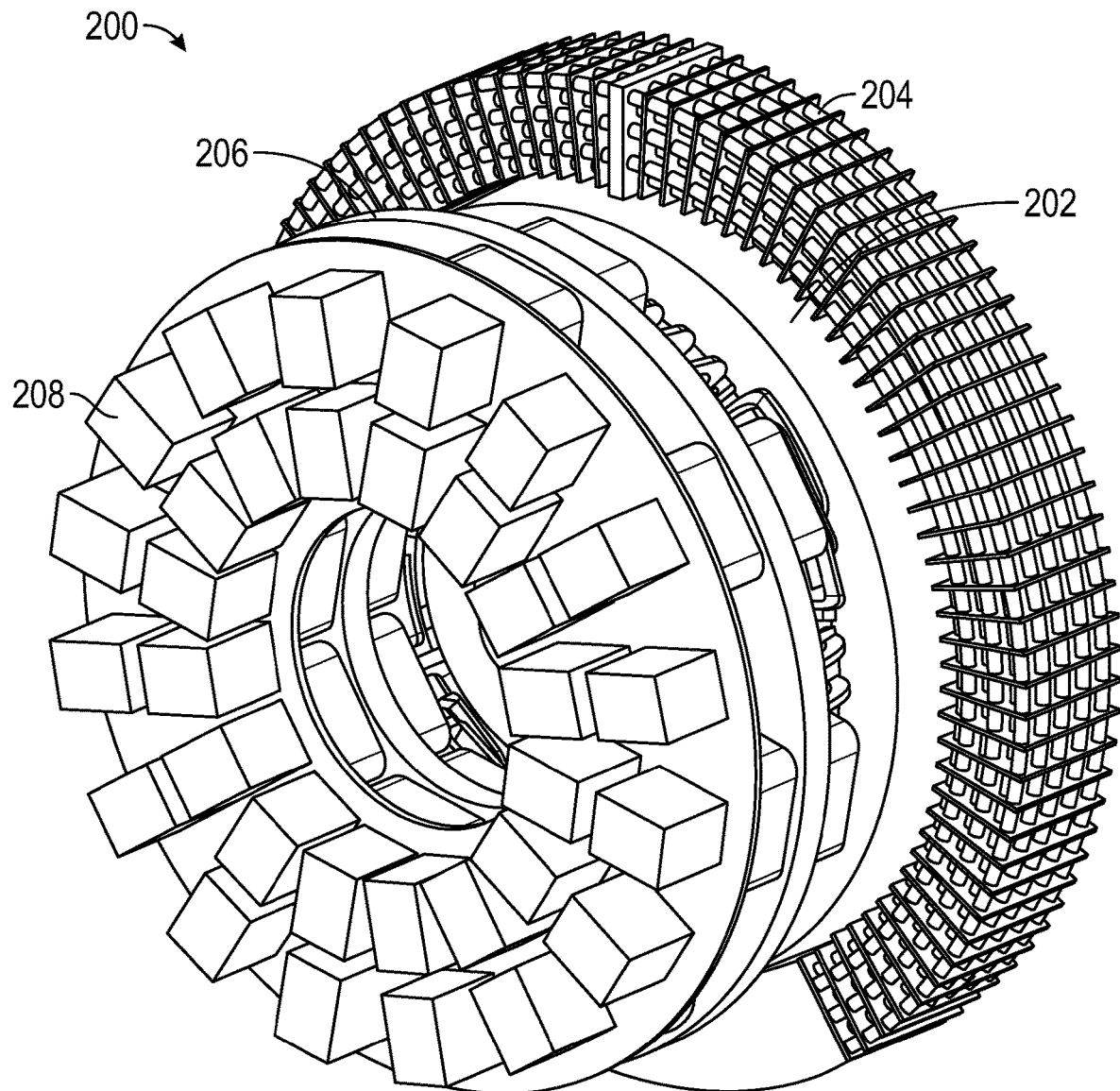
FIG. 2A is a schematic illustration of an aircraft electric motor in accordance with an embodiment of the present disclosure.
Figure 2B:
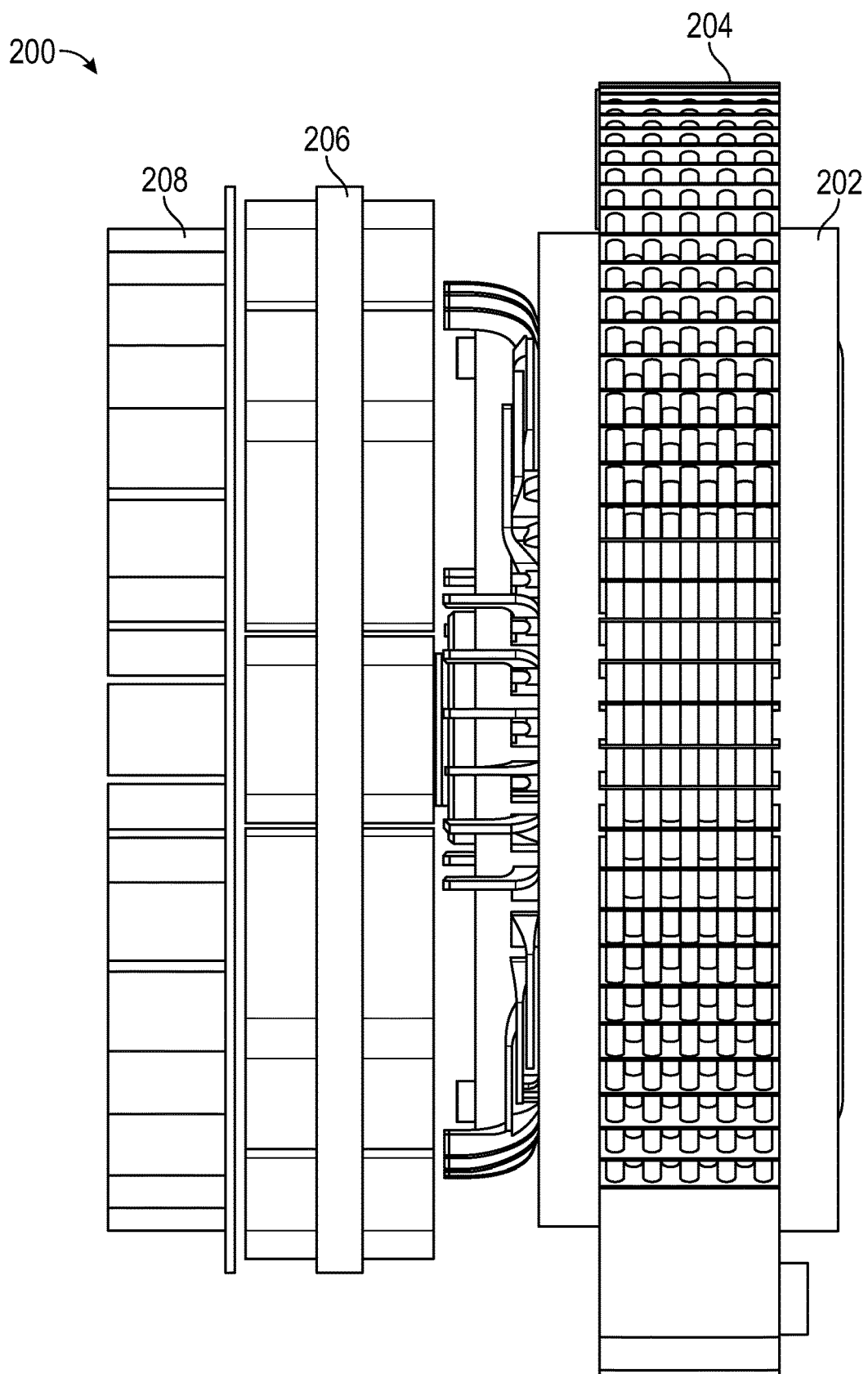
FIG. 2B is a side elevation view of the aircraft electric motor of FIG. 2A.
Figure 2C:
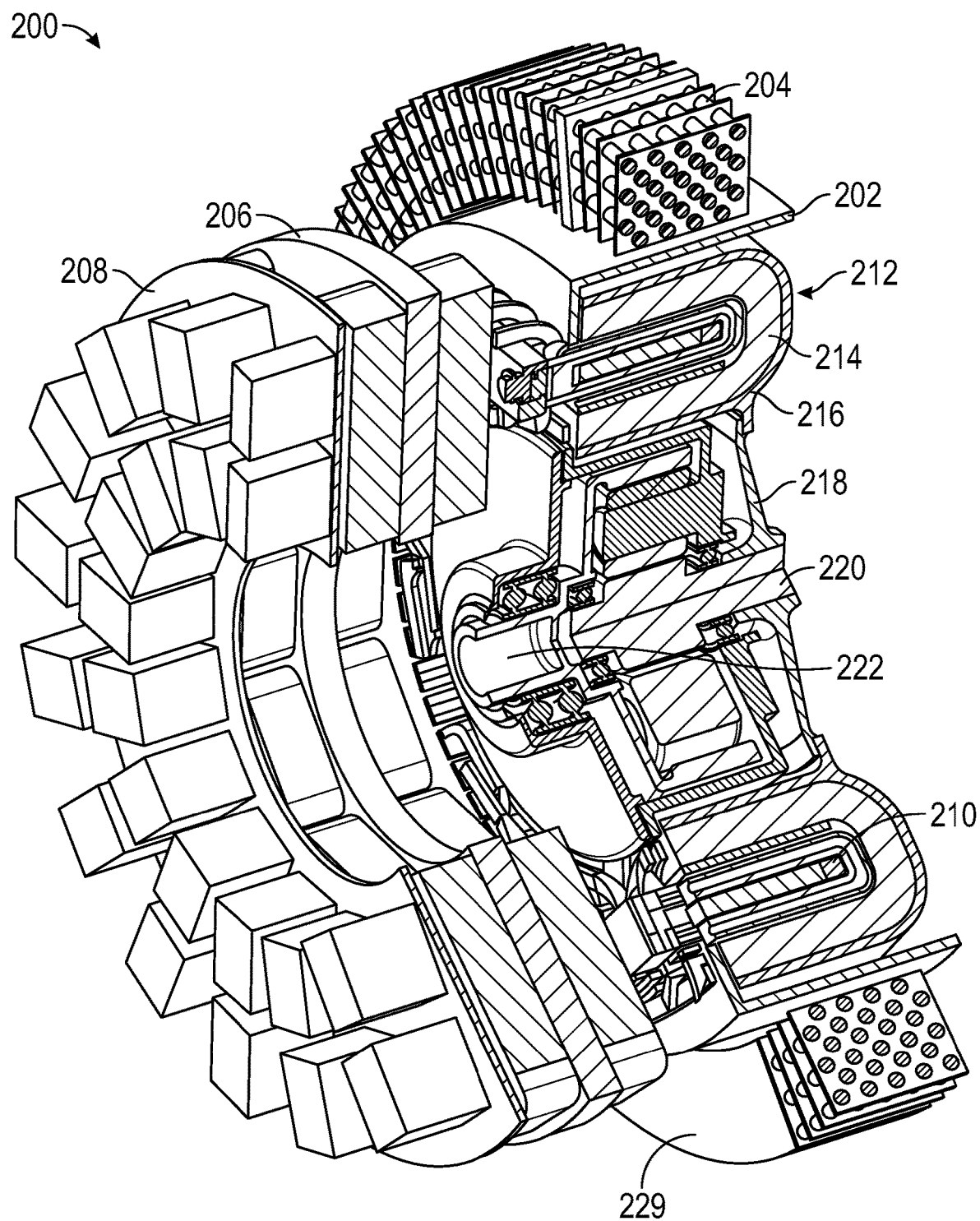
FIG. 2C is a partial cut-away illustration of the aircraft electric motor of FIG. 2A.
Figure 2D:
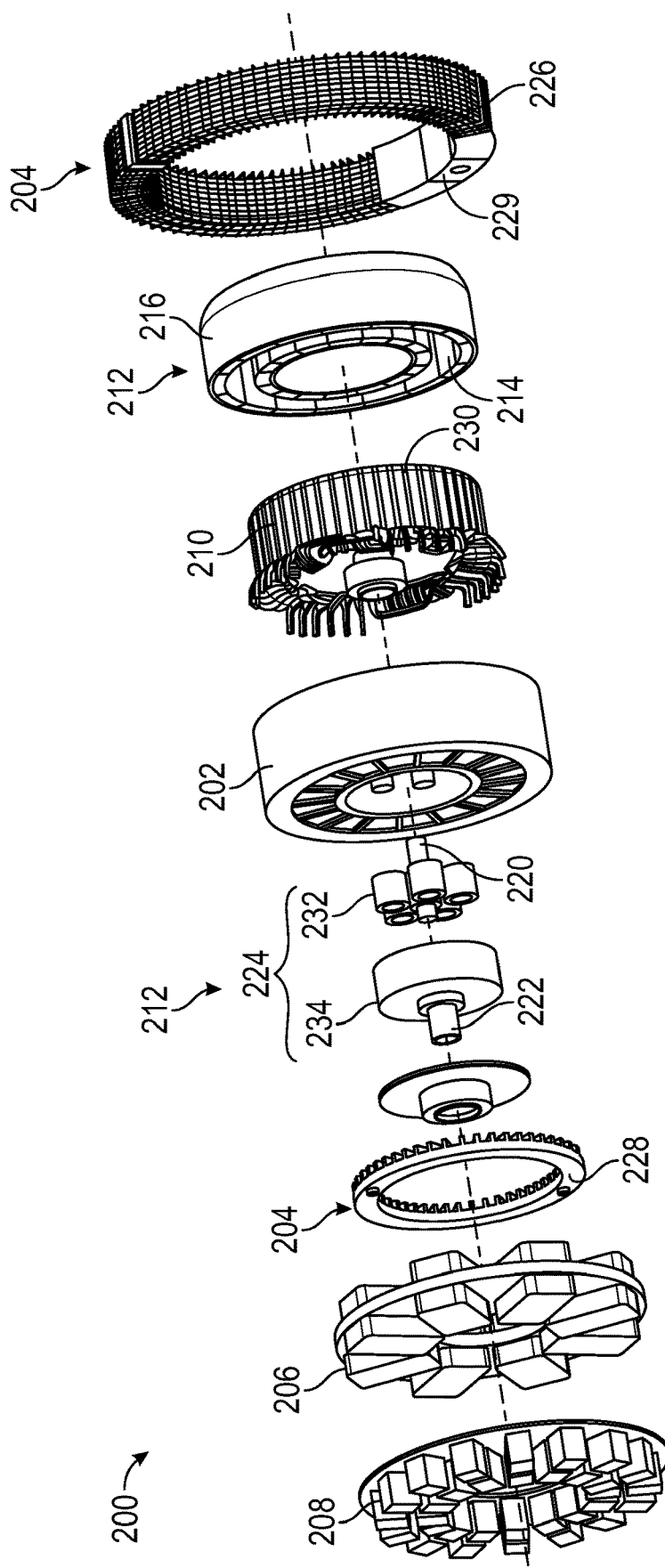
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that may enable control and operation of the aircraft electric motor 200. As such, the first and second power module systems 206, 208 may form, at least, a portion of a drive unit of the aircraft electric motor 200. The profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
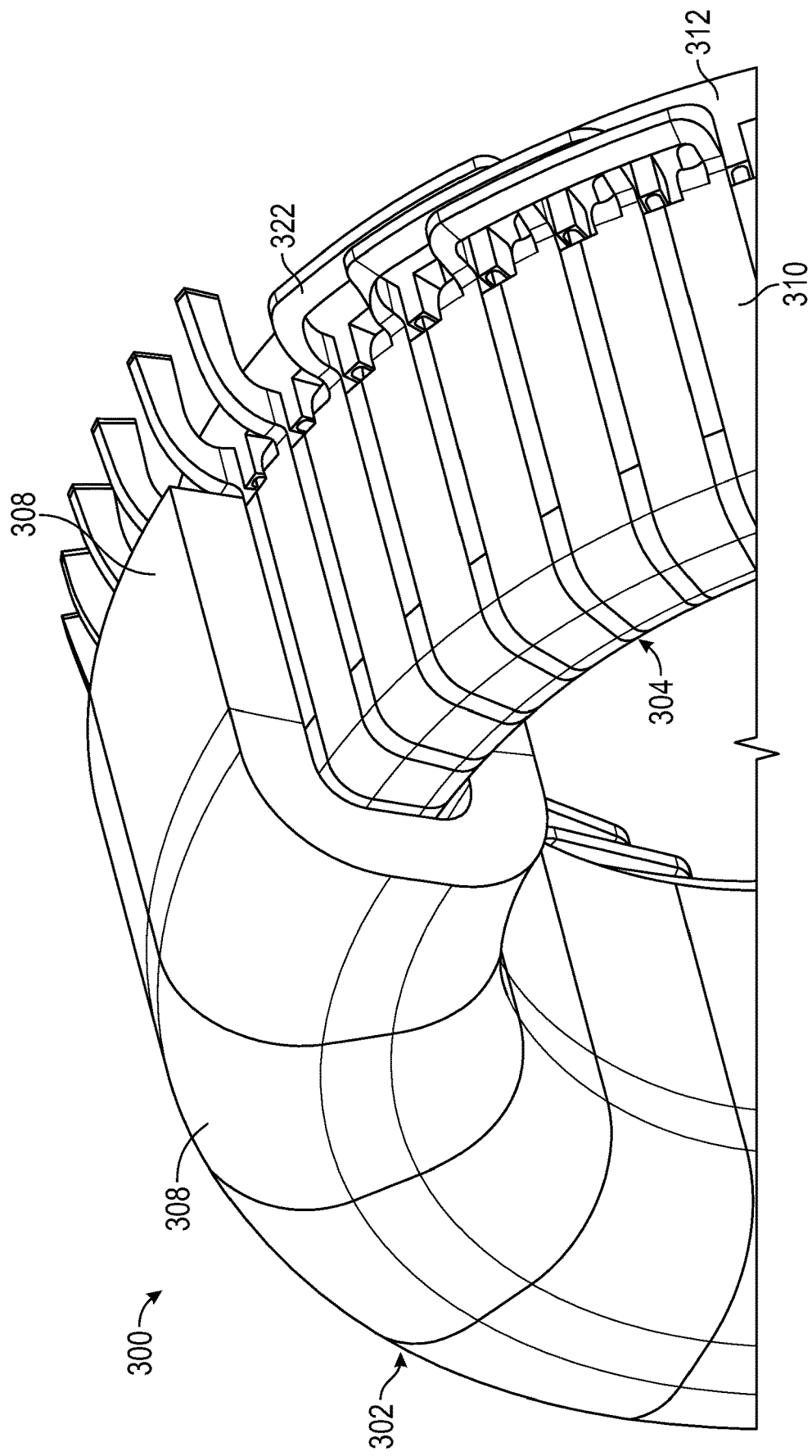
FIG. 3A is a schematic illustration of a rotor and stator of an aircraft electric motor in accordance with an embodiment of the present disclosure.
Figure 3B:
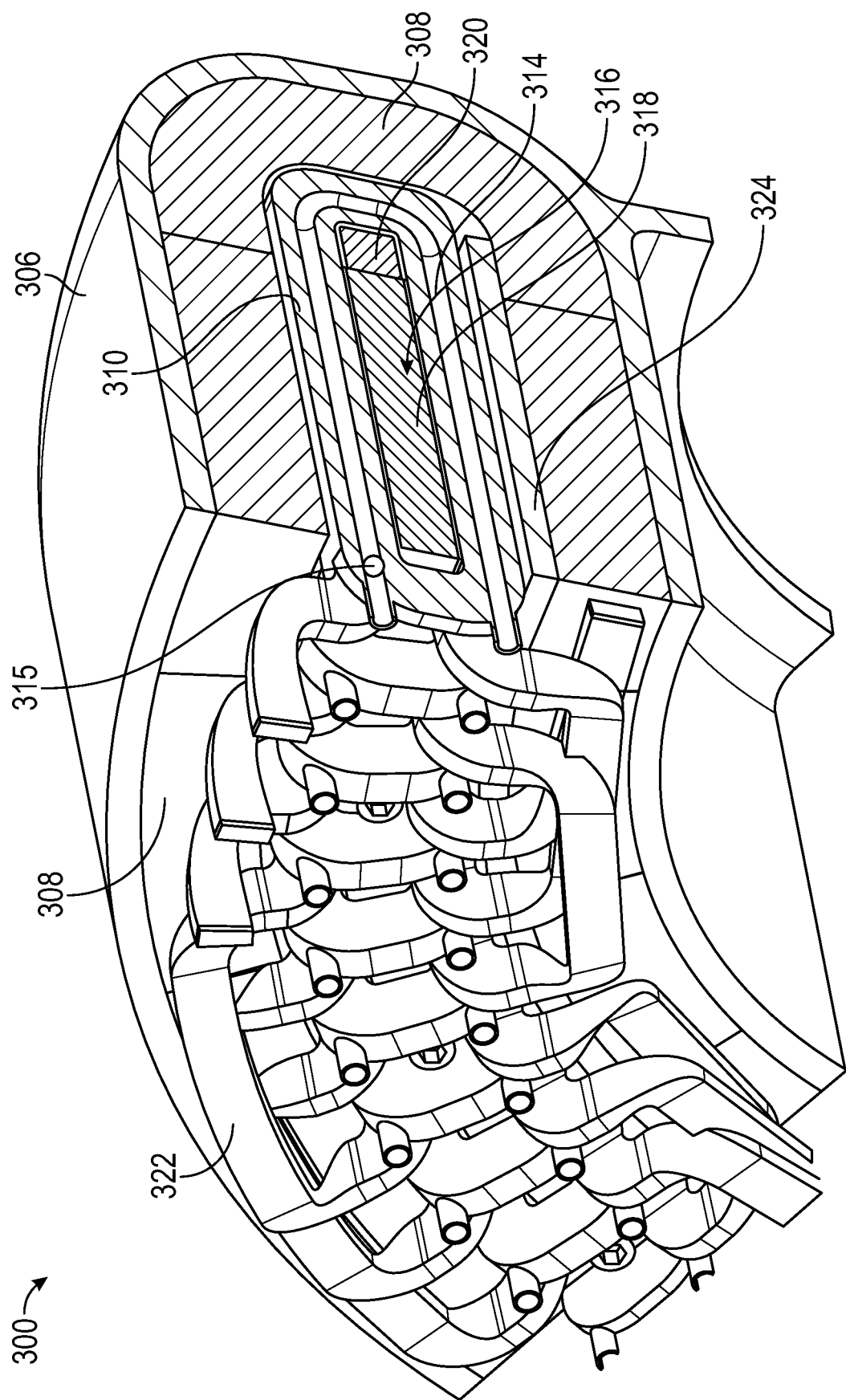
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular or annular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B. As shown in FIG. 3B, the cooling channels 314 may include a flow restrictor 315 arranged at an inlet side (or an outlet side) of the cooling channel 314. The flow restrictor 315 may be used to throttle the flow of a cooling fluid to provide efficient cooling within the cooling channels 314.

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 308 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

High-power-density aviation-class electric motor and drives, as described above, may require advanced cooling technologies. These machines are generally thermally limited at high power ratings and their performance can be improved by mitigating thermal limitations. Two-phase cooling is a highly efficient approach for cooling the heat generating components. In accordance with embodiments of the present disclosure, a cooling refrigerant is configured to boil and evaporate within embedded micro-channels in the electric components such as the winding.

In accordance with embodiments of the present disclosure, the channel structure of the cooling channels within windings of an aircraft electric motor are enhanced with structures that enhance heat transfer. As the fluid flows along the channel path, the pressure increases due to phase change from liquid to gas. In accordance with embodiments of the present disclosure, to accommodate the increase in pressure along the flow path, the cooling channels increase in area along the flow path. This effect can be achieved, in accordance with embodiments of the present disclosure, by increasing the diameter of the channel along a diverging flow path, modifying inner surface features to increase effective flow area, or by configuring the channels in a branching format. In accordance with embodiments of the present disclosure, the cooling channels can be of any size, particularly millimeter sized channels and microchannels may be implemented in some embodiments. Combined with an in-slot motor cooling configuration, the flow channels and motor windings can be co-located inside of motor slots, thus enhancing cooling of the systems.

Turning now to FIGS. 4A-4C, schematic illustrations of a portion of an aircraft electric motor 400 in accordance with an embodiment of the present disclosure are shown. The illustration of FIGS. 4A-4C is of a winding 402 that may be part of a stator, similar to that shown and described above. In accordance with embodiments of the present disclosure, the winding 402 includes an embedded or internal cooling channel 404. The winding 402 extends from first end 406 to a second end 408. The cooling channel 404 extends from an inlet 410 formed in the first end 406 of the winding 402 to an outlet 412 formed in the second end 408 of the winding 402.

The cooling channel 404, in this embodiment, is not a uniform diameter passage through the winding 402, but rather has an increasing diameter from the inlet 410 to the outlet 412. In this embodiment, the transition is smooth and continuous from the inlet 410 to the outlet 412. In some non-limiting embodiments, the inlet 410 may have a cross-sectional (circular) area that is 50% or less of the cross-sectional (circular) area of the outlet 412. Stated another way, in some non-limiting embodiments, the cross-sectional area at the outlet 412 is at least twice the cross-sectional area at the inlet 410.

Figure 5A:
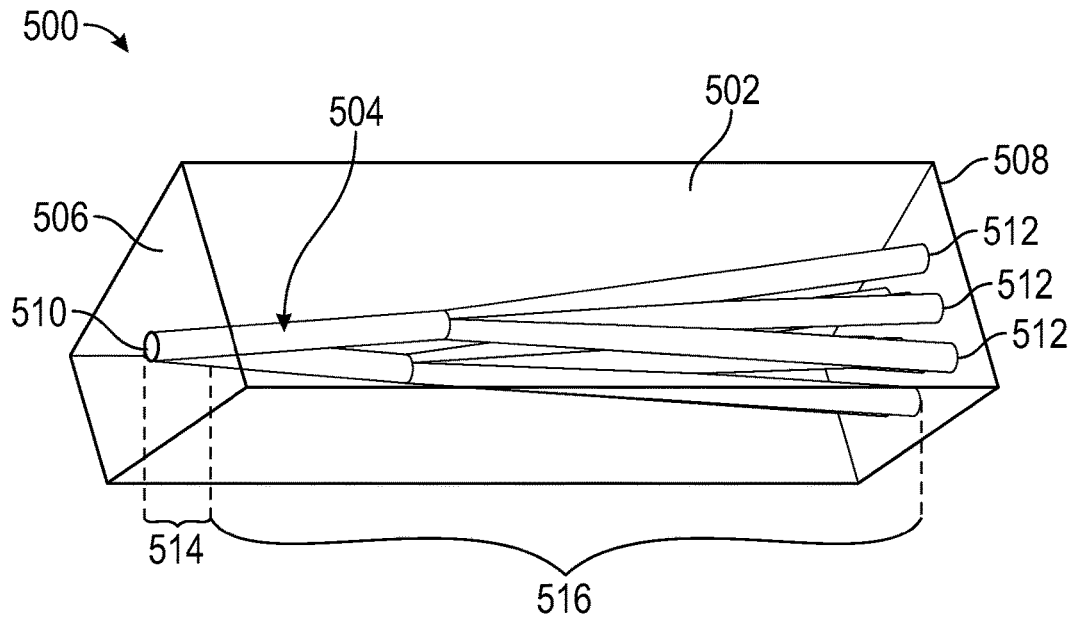
FIG. 5A is a schematic illustration of a portion of an aircraft electric motor system in accordance with an embodiment of the present disclosure.
Figure 5B:
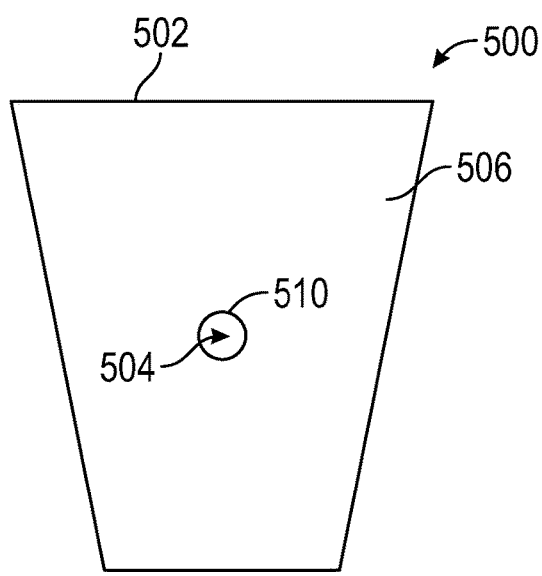
FIG. 5B is a schematic illustration of a first end of the portion shown in FIG. 5A.
Figure 5C:
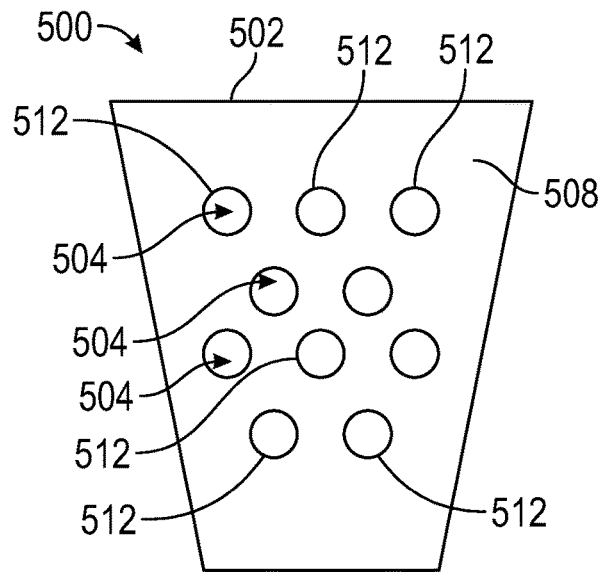
FIG. 5C is a schematic illustration of a second end of the portion shown in FIG. 5A.

Turning now to FIGS. 5A-5C, schematic illustrations of a portion of an aircraft electric motor 500 in accordance with an embodiment of the present disclosure are shown. The illustration of FIGS. 5A-5C is of a winding 502 that may be part of a stator, similar to that shown and described above. In accordance with embodiments of the present disclosure, the winding 502 includes an embedded or internal cooling channel 504. The winding 502 extends from a first end 506 to a second end 508. The cooling channel 504 extends from an inlet 510 formed in the first end 506 of the winding 502 to a plurality of outlets 512 formed in the second end 508 of the winding 502.

The cooling channel 504, in this embodiment, is formed of an inlet section 514 that extends from the inlet 510 toward the second end 508 of the winding 502. The cooling channel 504 separates from the inlet section 514 into a branching section 516. In some embodiments, the inlet section 514 may not have any depth or length and may only be defined by the inlet 410 formed in the first end 506 of the winding 502 and the branching of the cooling channel 504 may begin immediately. In other embodiments, the inlet section 514 may extend for a length into the winding 502 prior to separating into the branching section 516. As shown, the inlet 510 and the outlets 512 may be substantially similar in cross-sectional diameter. However, as a result of the branching of the cooling channel 504 and the multiple outlets 512, the exit or outlet total cross-sectional area is greater than that of the inlet 510. In some non-limiting embodiments, the inlet 510 may have a cross-sectional (circular) area that is 50% or less of the total cross-sectional area of the outlets 512 (aggregated). Stated another way, in some non-limiting embodiments, the total cross-sectional area at the outlets 512 is at least twice the cross-sectional area at the inlet 510.

It will be appreciated that the smooth increase in diameter configuration described with respect to FIGS. 4A-4C can be implemented with the branching configuration of FIGS. 5A-5C. For example, each branch of the branching section my include increasing diameter passages.

Figure 6A:
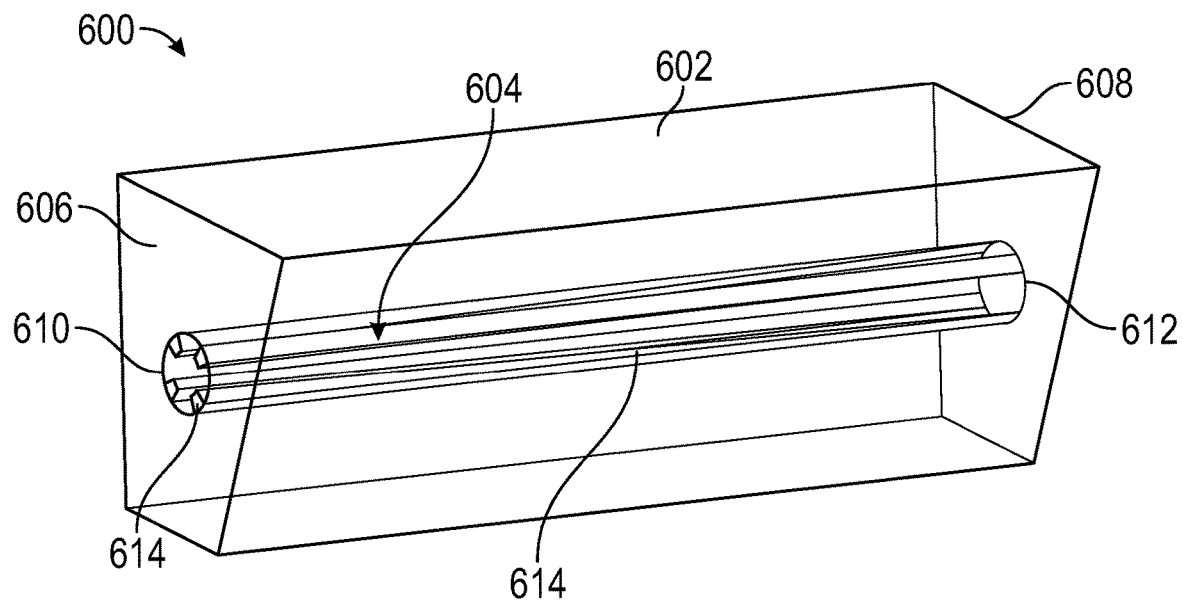
FIG. 6A is a schematic illustration of a portion of an aircraft electric motor system in accordance with an embodiment of the present disclosure.
Figure 6B:
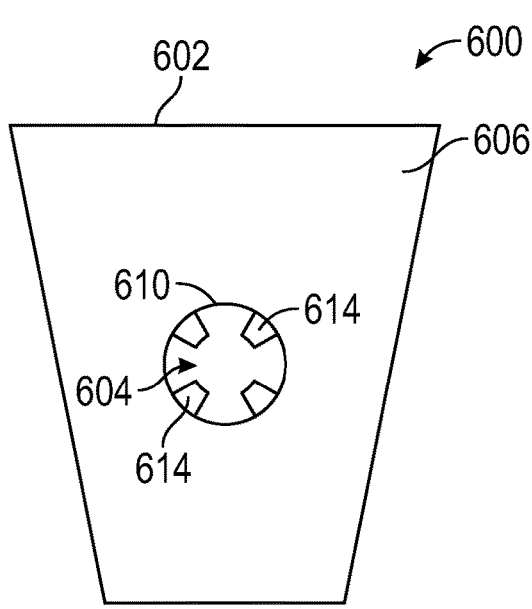
FIG. 6B is a schematic illustration of a first end of the portion shown in FIG. 6A.
Figure 6C:
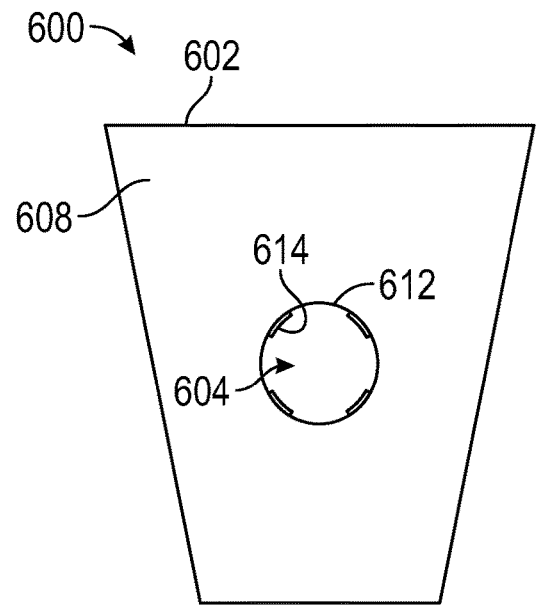
FIG. 6C is a schematic illustration of a first end of the portion shown in FIG. 6A.

Turning now to FIGS. 6A-6C, schematic illustrations of a portion of an aircraft electric motor 600 in accordance with an embodiment of the present disclosure are shown. The illustration of FIGS. 6A-6C is of a winding 602 that may be part of a stator, similar to that shown and described above. In accordance with embodiments of the present disclosure, the winding 602 includes an embedded or internal cooling channel 604. The winding 602 extends from a first end 606 to a second end 608. The cooling channel 604 extends from an inlet 610 formed in the first end 606 of the winding 602 to an outlet 612 formed in the second end 608 of the winding 602.

The cooling channel 604, in this embodiment, is formed of a substantially uniform diameter passage (e.g., a diameter of the inlet 610 is substantially the same as a diameter of the outlet 612). However, to achieve an increased cross-sectional area, similar to that described above, the cooling channel 604 includes one or more surface features 614 on the interior surface of the passage walls. The surface features 614 are structures or material distributed along the axial length of the cooling channel 604 that are configured to restrict flow and/or reduce a cross-sectional area of the cooling channel. As shown in the embodiment of FIGS. 6A-6C, the surface features 614 are formed as axial ribs or blades that extend from the inlet 610 to the outlet 612. In a flow direction from the inlet 610 to the outlet 612, the surface features 614 reduce the amount of cross-sectional area they occupy within the cooling channel 604. In this illustrative embodiment, the surface features 614 extend the full length of the cooling channel 604 (i.e., from the inlet 610 to the outlet 612). In other embodiments, the surface features may terminate at a point upstream of the outlet, and thus may not be present at all at the outlet.

In the embodiment of FIGS. 6A-6C, the surface features 614 are configured as ribs, rails, protrusions, blades, or similar structure. However, such surface features, in accordance with embodiments of the present disclosure are not so limited in structure. For example, the surface features that impact the cross-sectional flow area through a cooling channel may be formed as fins (axial and concentric), fins (rectangular, triangular, rounded, pin fins), turbulators, dimples, coatings having area reducing properties (e.g., thickness, roughness, texture, etc.).

The surface features 614 cause the cross-sectional area of the cooling channel 604 to increase from the inlet 610 to the outlet 612. In some non-limiting embodiments, the inlet 610 may have an unobstructed cross-sectional area that is 50% or less than an unobstructed cross-sectional area at the outlet 612. Stated another way, in some non-limiting embodiments, the total cross-sectional flow area at the outlet 612 is at least twice the total cross-sectional flow area at the inlet 610. It will be appreciated that the surface features described with respect to FIGS. 6A-6C may be incorporated into the other configurations described herein (e.g., FIGS. 4A-4C, 5A-5C, etc.).

Figure 7A:
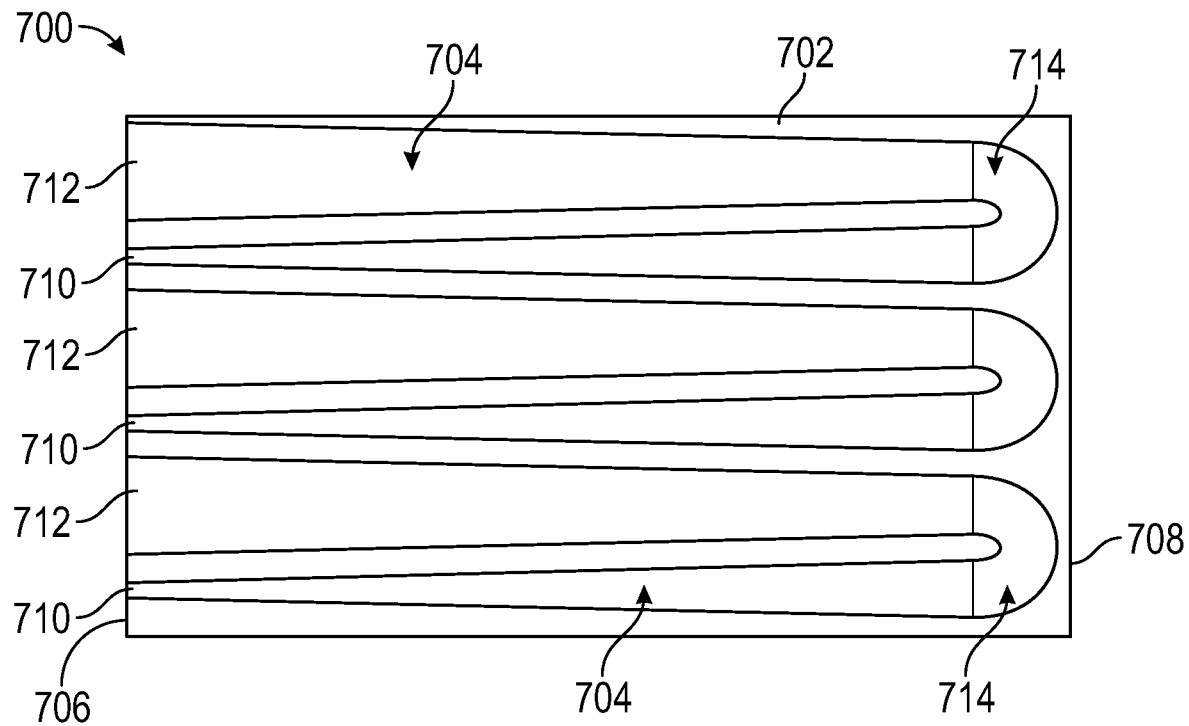
FIG. 7A is a schematic illustration of a portion of an aircraft electric motor system in accordance with an embodiment of the present disclosure.
Figure 7B:
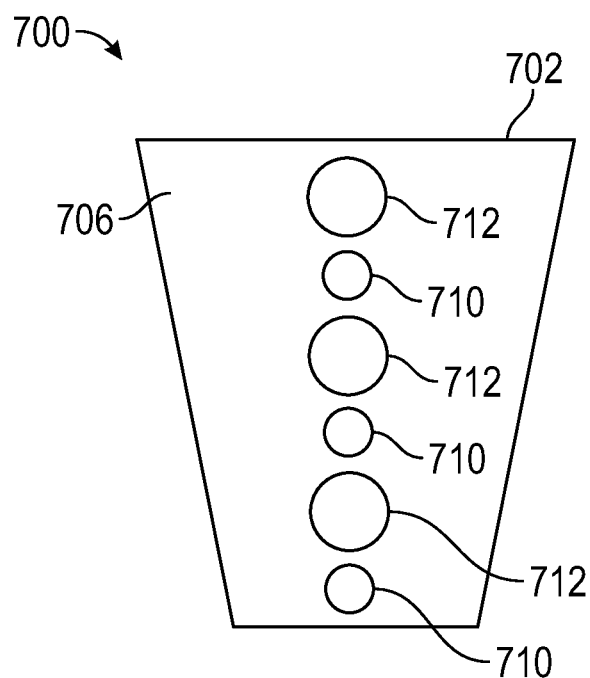
FIG. 7B is a schematic illustration of a first end of the portion shown in FIG. 7A.

Turning now to FIGS. 7A-7B, schematic illustrations of a portion of an aircraft electric motor 700 in accordance with an embodiment of the present disclosure are shown. The illustration of FIGS. 7A-7B is of a winding 702 that may be part of a stator, similar to that shown and described above. In accordance with embodiments of the present disclosure, the winding 702 includes a plurality of embedded or internal cooling channels 704. The winding 702 extends from a first end 706 to a second end 708. Each cooling channel 704 extends from an inlet 710 formed in the first end 706 of the winding 702 to an outlet 712 also formed in the first end 708 of the winding 702. That is, the inlet 710 and the outlet 712 are formed in the same end (first end 706) of the winding 702.

The cooling channels 704 are similar to the cooling channels 404 described with respect to FIGS. 4A-4C in that the cooling channels 704 have a relatively small diameter inlet 710 and a larger diameter outlet 712. However, because the inlet 710 and the outlet 712 are formed in the same end (first end 706) of the winding 702, each cooling channel 704 includes a turn 714. In this embodiment, the turn 714 is proximate the second end 708 of the winding 702.

Similar to the cooling channel 404, in this embodiment, the cooling channels 704 are not uniform diameter passages through the winding 702, but rather have increasing diameters from the inlet 710 to the outlet 712. In this embodiment, the transition is smooth and continuous from the inlet 710 to the outlet 712 (inclusive of the turn 714). In some non-limiting embodiments, the inlet 710 may have a cross-sectional (circular) area that is 50% or less of the cross-sectional (circular) area of the outlet 712. Stated another way, in some non-limiting embodiments, the cross-sectional area at the outlet 712 is at least twice the cross-sectional area at the inlet 710.

It will be appreciated that the multiple cooling channel configuration of FIGS. 7A-7B may be arranged to include features or configurations shown and described above (e.g., surface features, branching channels, etc.). Furthermore, the multi-channel configuration of FIGS. 7A-7B may be implemented with the other configurations, such that, for example, in FIGS. 4A-4C, multiple cooling channels 404 may be formed in a single winding 402 that extend from an inlet at the first end 406 to an outlet at the second end 408. Similarly, in the branching configuration, multiple inlets may be arranged to each branch to outlets that are formed in the first or second end of the winding (e.g., having a turn if the outlet is formed at the same end as the inlet).

Figure 8:
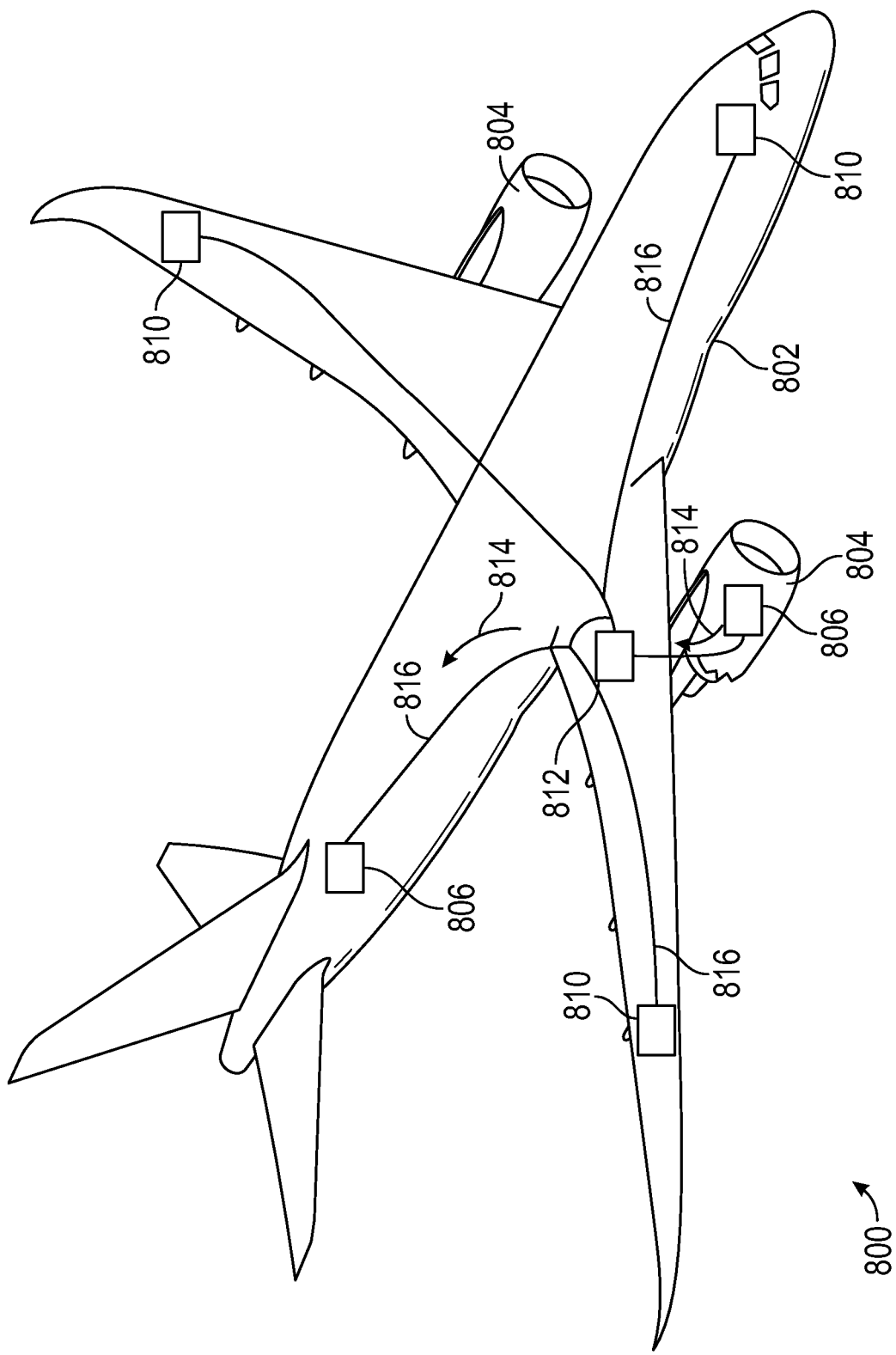
FIG. 8 is a schematic view of a power system of an aircraft that may employ embodiments of the present disclosure.

Referring now to FIG. 8, a power system 800 of an aircraft 802 is shown. The power system 800 includes one or more engines 804, one or more electric motors 806, a power bus electrically connecting the various power sources 804, 806, and a plurality of electrical devices 810 that may be powered by the engines 804 and/or motors 806. The power system 800 includes a power distribution system 812 that distributes power 814 through power lines or cables 816.

The electric motors 806 of the aircraft 802 may be configured similar to the aircraft electric motors shown and described above.

Advantageously, embodiments of the present disclosure provide for improved electric motors for aircraft and aviation applications. The aircraft electric motors of the present disclosure have improved cooling channels that may improve cooling while eliminating or at least reducing the challenges with cooling windings of aircraft electric motors. For example, advantageously, embodiments of the present disclosure may enable improved flow (e.g., flow stability) of a two-phase cooling fluid that passes through the cooling channels. As a two-phase cooling fluid passes from the relatively narrow inlet end of the cooling channels it may be a substantially liquid fluid. However, as heat is picked up along the cooling channel from the material of the winding, the fluid may transition to a gas and thus require a greater volume to ensure continuous and unimpeded flow, and thus the cross-sectional area of the cooling channels will be increased to accommodate the change in phase of the two-phase fluid as it passes through the cooling channel. As described herein, the cooling fluids may be a saturated refrigerant (e.g., dielectric refrigerants including, but not limited to, hydrofluorocarbons (HFC), hydrofluro-olefins (HFO), and/or hydrofluoroethers (HFE)).

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
    a motor unit having a rotor and a stator, wherein the stator includes a plurality of windings and cooling channels arranged to provide cooling to the plurality of windings;
    a drive unit configured to drive operation of the motor unit; and
    a cooling system comprising:
        at least one cooling channel integrally formed within at least one winding, wherein the at least one cooling channel comprises an inlet to receive a two-phase cooling fluid and an outlet configured to discharge the two-phase cooling fluid, wherein a cross-sectional area of the at least one cooling channel at the inlet is less than a cross-sectional area of the at least one cooling channel at the outlet.

2. The aircraft electric motor of claim 1, wherein the at least one winding has a first end and a second end, wherein the inlet is formed in the first end and the outlet is formed in the second end.

3. The aircraft electric motor of claim 1, wherein the at least one winding has a first end and a second end, wherein the inlet is formed in the first end and the outlet is formed in the first end.

4. The aircraft electric motor of claim 1, wherein the at least one cooling channel comprises a plurality of cooling channels formed within the at least one winding.

5. The aircraft electric motor of claim 4, wherein the at least one winding has a first end and a second end, wherein the inlet of each of the plurality of cooling channels is formed in the first end and the outlet of each of the plurality of cooling channels is formed in the second end.

6. The aircraft electric motor of claim 4, wherein the at least one winding has a first end and a second end, wherein the inlet of each of the plurality of cooling channels is formed in the first end and the outlet of each of the plurality of cooling channels is formed in the first end.

7. The aircraft electric motor of claim 6, wherein the at least one winding comprises a turn proximate the second end of the winding.

8. The aircraft electric motor of claim 1, wherein the at least one cooling channel comprises a single inlet and a plurality of outlets, wherein the single inlet is fluidly connected to each of the plurality of outlets.

9. The aircraft electric motor of claim 1, wherein the least one cooling channel comprises an inlet section defined by a single passage and a branching section defined by a plurality of passages, wherein the single passage of the inlet section is fluidly coupled to each of the plurality of passages of the branching section.

10. The aircraft electric motor of claim 1, wherein the at least one cooling channel comprises at least one surface feature arranged to reduce a cross-sectional area of the at least one cooling channel proximate the inlet and has a decreasing impact on the cross-sectional area of the at least one cooling channel in a direction toward the outlet.

11. The aircraft electric motor of claim 10, wherein the at least one surface feature comprises at least one rib or blade extending from the inlet toward the outlet along the at least one cooling channel.

12. The aircraft electric motor of claim 10, wherein the at least one surface feature comprises a surface coating applied to a surface of the at least one cooling channel.

13. The aircraft electric motor of claim 1, wherein the cross-sectional area of the inlet of the at least one cooling channel is 50% or less than the cross-sectional area of the outlet.

14. The aircraft electric motor of claim 1, wherein the cross-sectional area of the outlet of the at least one cooling channel is at least twice the cross-sectional area of the inlet.

15. The aircraft electric motor of claim 1, wherein the windings are arranged in a U-shape configuration.

16. The aircraft electric motor of claim 15, wherein the motor unit comprises rotor having U-shaped magnets arranged about the windings of the stator.

17. The aircraft electric motor of claim 1, wherein the cooling system further comprises:
 a header and a heat exchanger configured to supply cooling fluid into the at least one cooling channel.

18. The aircraft electric motor of claim 17, further comprising a pump configured to pump the cooling fluid from the header into the at least one cooling channel.

19. An aircraft electric motor comprising:
 a motor unit having a rotor and a stator, wherein the stator includes a plurality of windings and cooling channels arranged to provide cooling to the plurality of windings;
 a means for driving operation of the motor unit; and
 a cooling system comprising:
  at least one cooling channel integrally formed within at least one winding, wherein the at least one cooling channel comprises an inlet to receive a two-phase cooling fluid and an outlet configured to discharge the two-phase cooling fluid, wherein the at least one cooling channel defines a means for accommodating a change in phase of the two-phase fluid as it passes through the at least one cooling channel.

20. The aircraft electric motor of claim 19, wherein:
 the means for driving operation of the motor unit comprises at least one power module system, and
 the means for accommodating a change in phase of the two-phase fluid comprises a cross-sectional area of the at least one cooling channel at the inlet being less than a cross-sectional area of the at least one cooling channel at the outlet.

\* \* \* \* \*